United States Patent [19]
Doelves

[11] 4,245,260
[45] Jan. 13, 1981

[54] METHOD FOR IMPROVED REPRODUCTION OF EDGES BY ENGRAVING SCREENED PRINTING FORMS

[75] Inventor: Juergen Doelves, Kiel, Fed. Rep. of Germany

[73] Assignee: Dr. Ing. Rudolf Hell GmbH, Fed. Rep. of Germany

[21] Appl. No.: 941,542

[22] Filed: Sep. 11, 1978

[30] Foreign Application Priority Data

Sep. 17, 1977 [DE] Fed. Rep. of Germany ....... 2741953

[51] Int. Cl.³ .......................... H04N 1/22; H04N 1/40
[52] U.S. Cl. .................................... 358/299; 358/283; 358/284
[58] Field of Search .............................. 358/283–284, 358/296–303, 80

[56] References Cited

U.S. PATENT DOCUMENTS

| 2,865,984 | 12/1958 | Moe | 358/80 |
| 2,881,246 | 4/1959 | Fairchild | 358/299 |
| 3,769,455 | 10/1973 | de Voss et al. | 358/299 |
| 3,770,888 | 11/1973 | de Voss et al. | 358/299 |
| 3,983,319 | 9/1976 | Moe et al. | 358/283 |
| 4,013,829 | 3/1977 | Baar | 358/299 |

FOREIGN PATENT DOCUMENTS

2516332 10/1976 Fed. Rep. of Germany .

Primary Examiner—Raymond F. Cardillo, Jr.
Attorney, Agent, or Firm—Hill, Van Santen, Steadman, Chiara & Simpson

[57] ABSTRACT

A method for the improved reproduction of edges associated with sharp changes in tone density during the engraving of screened printing forms with an engraving tool. The engraving tool is controlled by an engraving signal obtained from superposition of an image signal and a screening signal. The image signal is derived from scanning an original with a resolution which is twice as large in the scanning direction as that of the printing screen. Based on the higher resolution the image signal is digitalized into principal image values and additional intermediate image values. If a sharp change in the density defined as an edge occurs in the original a principal image value and the associated intermediate image values are combined into one memory word after the image values have been recoded into values of shorter word lengths and intermediately stored. If no edge is present in the original only the principal image values are intermediately stored as memory words. The combined memory words are separated into the principal image values and the intermediate image values when read out of the memory. The principal image values are superimposed onto the screening signal at the instants of periodically recurrent amplitude values of the screening signal, when the engraving tool cuts the cups and the associated intermediate image values are superimposed before said instants. Thus, the engraving information for each cup consists of two image values, whereby the cups for a sharp change in tone density are shifted relatively to the printing screen toward a higher density level so as to accomplish improved reproduction of the edges. Storing the image values as described allows the capacity of the memory to remain constant although a bigger number of image values are processed.

18 Claims, 12 Drawing Figures

METHOD FOR IMPROVED REPRODUCTION OF EDGES BY ENGRAVING SCREENED PRINTING FORMS

BACKGROUND OF THE INVENTION

1. Field of the Invention

The present invention relates to a method for the production of half-tone printing forms where the engraving is accomplished with a plurality of small cups arranged in a printing screen and the engraving means is supplied an image signal and a screen signal to produce a printing screen and the engraving needle of the engraving means receives a periodically re-occurring amplitude value of the screen signal to produce its largest deflection in the direction of the printing form and wherein the analog image signal obtained by pattern scanning is digitalized and stored in an intermediate storage with the frequency of the screen signal into image values of predetermined word lengths which is superimposed after a subsequent digital analog conversion for driving the engraving needle and wherein during the pattern scanning, a recognition signal are generated to recognize sharp changes in tone density in the pattern.

2. Description of the Prior Art

U.S. Pat. No. 4,013,829 discloses an engraving machine for producing printing forms from patterns. The patterns may be continuous-tone patterns, so-called line patterns with writings and line representations or combinations of both elements.

The pattern to be reproduced is attached to a rotary scanning cylinder and is scanned by a scanning means which is moved along parallel to the scanning cylinder. Depending upon the tonal values of the scanned image points, more or less light will be reflected from the pattern into the scanning means and there converted electro-optically into an image signal which is digitalized by means of a scanning cycle sequence.

For the purpose of an electronic equalization of different diameters of the scanning and printing cylinders in the reproduction, the digital image signal is recorded with the aid of a scanning timing sequence and placed in an intermediate memory where it is again read out by means of a recording timing sequence and reconverted into an analog image signal. The analog image signal is fed to an electromagnetic engraving means which has an engraving pin as a cutting tool which moves axially along a rotating printing cylinder.

During engraving of the printing form, the engraving means engraves a sequence of cups arranged in a seamless manner in a printing screen with the depth depending in each case on the tonal value of the associated image dot.

For the screening, the analog image signal is superimposed on a screen signal which has a frequency that depends on the printing screen to be recorded and the surface speed of the printing cylinder.

The screen signal causes a vibrating lifting motion of the engraving pin corresponding to the printing screen and determines the instances when the engraving of the cups occur and the momentary image signal determines the depth of penetration of the engraving pin into the cup at the particular instant.

The engraved printing cylinder forms the printing form for the later printing process in a photogravure rotary machine.

The exact reproduction of contours in the pattern represents a particular problem in the production of screened printing forms. In the engraving system described in U.S. Pat. No. 4,013,829 the positions of the cups on the printing form are predetermined by the printing screen. On the other hand, during scanning, the contour lines extend arbitraily with regard to the scanning screen which is congruent with the printing screen to be recorded. Fine charges of edges therefore can be reproduced only in an unsatisfactory manner with a rigid cup arrangement. For example, fine edges extending obliquely to the scanning direction show a disturbing staircase-like arrangement.

Additionally, in prior art engraving systems, the shade values in the range of an edge are reproduced in a varied manner because of the transfer characteristics because of the mass of the electro-mechanical engraving means which results in a time delay between the time that the signal is applied and the actual physical movement of the cutting tool.

It is known that a sharper edge reproduction could be accomplished by using a finer printing screen. However, a finer printing screen has the drawback that during subsequent printing process the transfer of ink from the cups to the printing form is defective due to the smaller cup volumes of the finer printing screen.

U.S. Pat. No. 3,983,319 comprises an improvement for forming the edges by position shifting of screen points within the area of the edge.

In the reproduction apparatus for the exposure of screen images upon a photosensitive medium as described in U.S. Pat. No. 3,983,319 for the purpose of a sharper reproduction of the edge those screen points which reproduce edges are so shifted with respect to the positions predetermined by the printing screen that they subsequently impinge upon the edges.

In this reproduction apparatus, patterns are scanned additionally with a photo diode array arranged transversely to the scanning direction. With the presence of an edge extending in the scanning direction in the pattern, this photo diode array produces a control signal for the recording apparatus. The control signal moves a rotary mirror located in the path of rays of the luminous source for the recording such that the screen points are exposed and shifted perpendicularly to the direction of recording.

This reproduction system has the disadvantage that only edges extending in the scanning direction can be improved in the reproduction. A precise determination of the location of an edge is not possible.

Another disadvantage of this apparatus is that the method is not applicable for electro-magnetic engraving means because the engraving needle cannot be deflected rapidly either in the recording direction or transversely thereto but merely performs a stroke movement directly radially relative to the printing form.

German Publication OS No. 2,516,332 discloses that a reduction in the amount of data for reproduction of text can be utilized because a lower number of density steps is adequate for texts compared to reproduction of continuous-tone patterns.

In the method disclosed in the prior art a difference is made therefore betwen a continuous-tone code and a shorter text code. In the event that the pattern has continuous-tone and text areas the scanned density values are first and simultaneously converted into the continuous-tone code and into the text code. The selection of a code then is made by means of a control signal which is derived by using mask scanning or from measuring the surface extend of the individual areas of the pattern.

This known prior art method does not reduce the required memory capacity. Because the portion of continuous-tone and text areas in a pattern fluctuate, the memory must always be large enough to accommodate the largest quantity of data which occurs in a pure continuous-tone pattern.

The method of the prior art also has the disadvantages in that a control mask must be made for each pattern which is extremely time consuming and expensive. Additionally, the extensions of the pattern areas must be known so that the method is not universally applicable. It is also a disadvantage that the control signal is generated in each case only as a function of the pattern areas while the density leaps or jumps are not considered in a continuous-tone range.

SUMMARY OF THE INVENTION

It is an object of the present invention to solve the problems of the prior art and discloses a method for screen reproduction of printing forms wherein a more accurate recognition of the edges is accomplished and where for the purpose of improved reproduction of the edges a position shift of the cups can also be accomplished with an electro-magnetic engraving means and wherein the tonal values are reproduced in the range of an edge without being modified.

An additional problem solved by the present invention, is that the total memory capacity is reduced even though an increased amount of data is being processed.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

DESCRIPTION OF THE PREFERRED EMBODIMENTS

Figure 1:
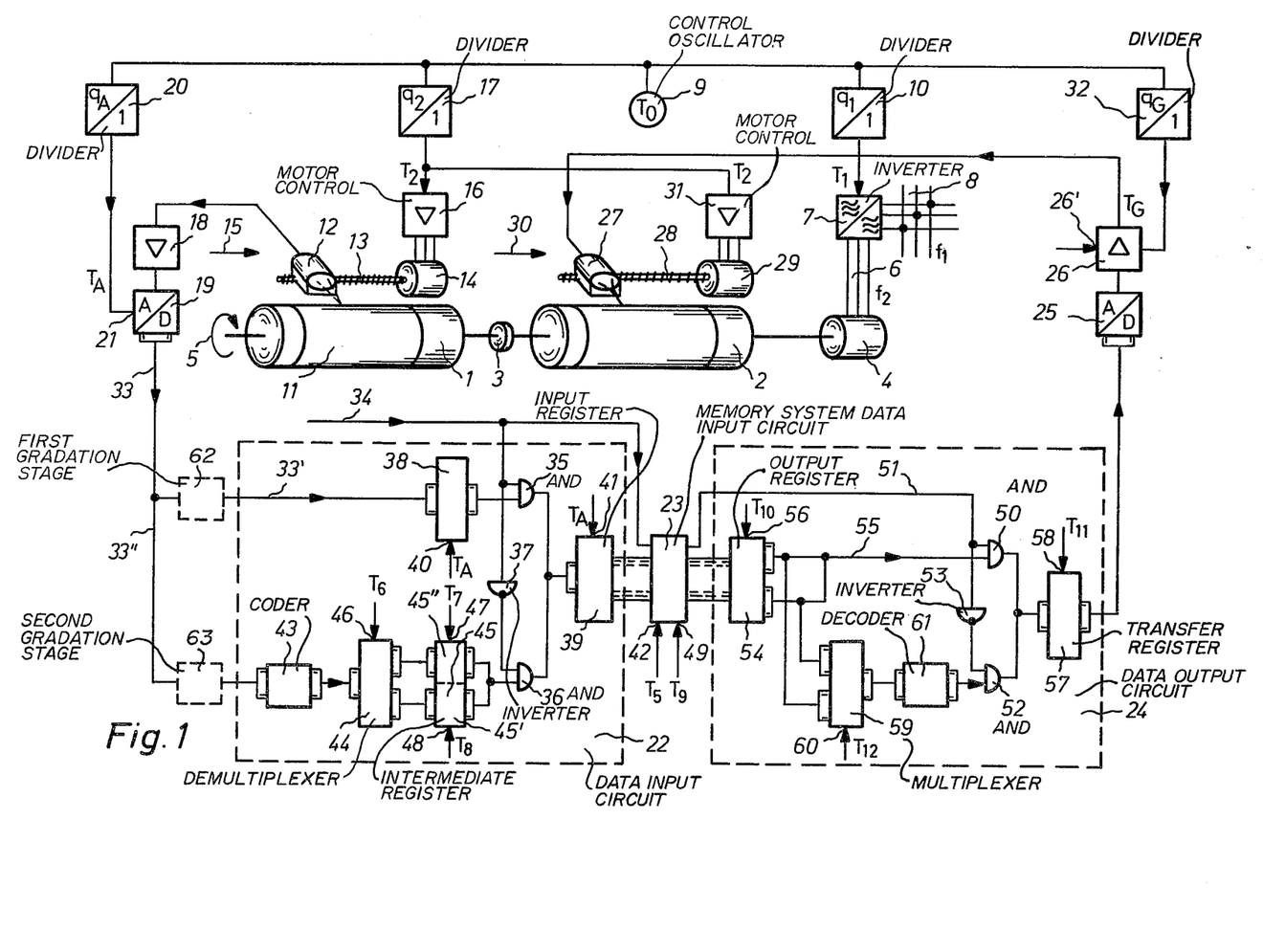
FIG. 1 illustrates in block diagram form an engraving system according to the invention wherein engraving signals are produced in a novel manner.

FIG. 1 is a block circuit diagram of an engraving system illustrating the invention.

The scanning cylinder 1 and printing cylinder 2 are interconnected by way of a clutch 3 and associated shafts and are driven by a synchronous motor 4 as indicated by arrow 5. The synchronous motor 4 receives a signal from a synthetic network 6 at a frequency of $f_2$ which is obtained from an inverter 7 that receives an input frequency $f_1$ from a network 8. The frequency $f_2$ of the synthetic network 6 as well as the number of revolutions per minute of the synchronous motor 4 are a function of the timing sequence $T_1$ of the inverter 7.

The timing sequence $T_1$ is obtained from a divider 10 which has a dividing factor of $q_1$ and which receives an input from a control oscillator 9 which has an output frequency $T_O$.

The inverter drive assures absolute rigid time relationship between the timing sequence $T_O$ and the circumferential speed of the cylinders 1 and 2. It is to be realized, of course, that the cylinders may also be driven separately with synchronous motors for each cylinder. Also, instead of using synchronous motors a non synchronous drive motor may be utilized for driving the cylinders 1 and 2. For that purpose, the control oscillator 9 may be designed as an impulse transmitter which is connected with the shaft of the cylinders 1 and 2. The invention may also be utilized with a flat base engraving system.

A pattern 11 which is to be reproduced is fastened to the scanning cylinder 1 in a conventional manner and the pattern may contain continuous-shade areas and text areas.

In a continuous-tone area which contains the images for example, a multiplicity of gradations of density extending into each other are differentiated between "black" and "white". Density jumps only occur at edges. In the area of the texts with texts and line presentation, only two density values which are "black" and "white" are differentiated and steep density leaps or jumps occur at the black-white transfers.

So as to obtain an image signal, the pattern 11 is scanned by an electro-optical scanning means 12 dot-wise and image line-wise along a scanning screen.

The scanning means 12 is moved with a motor 14 and a spindle 13 so as to move the scanning means parallel to the scanning cylinder as indicated by the arrow 15. The motor 14 receives a signal from a motor control stage 16 which receives an input signal from a timing pulse sequence $T_2$. The timing sequence $T_2$ is produced by division of the timing sequence $T_O$ of the control oscillator 9 in a divider 17 which has a dividing factor of $q_2$.

The image signal is fed to an amplifier 18 where it is amplified and logarithmed so that the image signal is proportional to the scanned density of the pattern.

The amplified image signal is supplied from the amplifier 18 to an analog to digital converter 19 which might, for example, be an ADC type 8S manufactured by Analog Devices which has a resolution of 8 bits where an analog image signal changing from zero "black" to the maximum value "white" is digitalized into 256 discrete density values between 0 to 255.

The analog to digital conversion of the image signal is controlled by a timing pulse sequence $T_A$ having a frequency timing pulse. The scanning timing sequence $T_A$ is produced by frequency division of the timing sequence $T_O$ in an additional divider means 20 having a dividing factor $q_4$ which is fed to the control input 21 of the A/D converter 19.

The digital image signal is supplied from analog to digital converter 19 to a data input circuit 22 which is connected to a memory system 23 which is in turn connected to a data output circuit 24. A digital to analog converter 25 is connected to the data output circuit 24 and reconverts the output signal into an analog image signal which is supplied to an engraving amplifier 26 where it is superimposed with a screen signal and fed to an electro-magnetic engraving means 27 having an engraving pin as a cutting tool which accomplishes the engraving of the cups on the printing cylinder 2.

The engraving means 27 is moved with the aid of a spindle 28 and a motor 29 parallel to the printing cylinder 2 in the direction of arrow 30. The motor 29 is driven by a motor control stage 31 which receives the timing pulse sequence $T_2$ from the divider 17.

So as to generate the screen signal, the engraving amplifier 26 receives an engraving timing sequence $T_G$ which is obtained from the timing sequence $T_O$ of the control oscillator 9 by utilizing an additional divider means 32 having a dividing factor of $q_g$.

The engraving timing sequence $T_G$ is converted in the engraving amplifier 26 into a screen signal having a frequency $f_G$.

Although the screen signal determines the printing screen and generates a vibrating movement for the engraving pin such that in each case at a periodically re-occurring amplitude value of the screen signal, the pin receives its greatest deflection in the direction of the printing form and engraves one cup, the instantaneous image signal determines the penetration depth of the engraving pin into the printing form and, thus, the tonal value to be recorded.

The screen signal may, for example, comprise a sinusoidal or a triangular AC voltage.

The processing of the digital image value between scanning and recording is explained in greater detail hereafter.

The pattern 11 is scanned according to a scanning screen which is finer than the printing screen so that a more accurate determination of the position of a contour is accomplished and several image data can be produced and processed for each cup. In a particular embodiment constructed according to the invention, the fineness of scanning has been selected to be twice as great so that for each cup to be engraved two image values staggered in time are available. A difference is maintained between a principle image value and an intermediate image value. The principle image values represent the brightness data of the image points in the pattern geometrically associated with the cups in the screen to be recorded and the intermediate image values represent the brightness data scanned between these image dots.

The higher resolution in the scanning direction is accomplished in the embodiment using a frequency of $f_A$ of the scanning timing sequence $T_A$ which is higher than the frequency $f_G$ of the screen signal.

Generally, the relationship between the frequency $f_G$ of the screen signal and the frequency $f_A$ of the scanning timing sequence $T_A$ is indicated by the equation $f_A = n \times m \times f_G$ where "n" identifies the scanning fineness and "m" identifies a factor of proportionality.

Since the scanning fineness is twice as great in the particular embodiment and since no change in scale occurs and the cylinders are assumed to have identical diameters $n=2$ and $m=1$.

To obtain the intermediate values, it would be possible to also provide a second A/D converter with a corresponding timing control. Also, the pattern 11 could be scanned with a photo diode array oriented in the scanning direction whereby the image signals would have to be intermediately stored.

By utilizing analog to digital conversion an 8 bit image value supplied by conductor 33 of the data input circuit 22 occurs at the digital output of the A/D converter 19 for each scanned image dot.

Data Input Circuit

In the invention, the data input circuit 22 converts the image values by recoding and packaging in various functions the momentarily scanned pattern areas such that in spite of the double amount of data, the number of memory cells in the memory system remains constant. When scanning a continuous-tone image detail of a pattern 11 only the associated principle image values for each cup with the full resolution of 8 bits (1 byte) of 256 density values will be stored in the memory system 23.

When text area or a contour image detail is scanned in a continuous-tone area, comprehensively referred to as edge image detail, the principle and the intermediate image values are considered for each cup such that the first 8 bit data of the A/D converter 19 are recorded into shorter 4 bit data, that is, into only 16 density values and then in each case the recoded principle and intermediate image values for one cup are combined and transferred into the memory system 23.

An edge recognition circuit not illustrated in FIG. 1 generates an edge recognition signal (recognition bit) which is supplied on a conductor 34 which furnishes an indication as to whether at a particular time a continuous-tone image detail extended density of a contour image detail is being scanned.

The recognition signal is obtained from the analog or digital image signal by evaluating the surrounding area or by scanning a mask. A decision about the instantaneous image structure can be reached on the basis of various criteria as discussed hereafter.

The date input circuit 23 operates in the following manner. In the event that a continuous-tone image detail is scanned at a particular instance the recognition bit is "H" and the AND gate 35 will be prepared and the AND gate 36 will be blocked by the inverter 37.

Principal and intermediate image values are transferred continuously in the sequence determined by the pattern scanning by way of conductor 33' and an intermediate register 38 to the input register 39. The transfer is controlled by the scanning timing sequence $T_A$ which is received at the timing inputs 40 and 41 of the registers 38 and 39, respectively.

However, in each case, only the principal image value of one cup is recorded into the memory system 23 and the recognition bit "H" is added to each value as a ninth bit. The recording process continues with a recording timing sequence $T_5$ which is supplied at input 42 and which has a frequency that is one-half that of the scanning timing sequence $T_A$.

Thus, for one continuous-tone image detail, the engraving data of one cup consits of a nine bit memory word with one bit representing the recognition bit and 8 bits representing the principal image value as the density data.

Simultaneously, the image values furnished by the A/D converter are fed by way of conduit 33" to a coder 43 in the form of a programmable read only memory (PROM). In the read only memory the recoding of the 8 bit image values (continuous-tone code) into 4 bit image values (text code) take place. Therefore the image values call for corresponding addresses of the read only memory under which the associated 4 bit image values are stored.

The programmable read only memory may be, for example, a type 74S470 manufactured by Texas Instruments Corporation which has a memory organization of 256×8 bits.

The recoded principle and intermediate image values are transferred consecutively by means of a demultiplexer 44 which may be constructed from components such as type SN7408 from Texas Instruments Corporation and which supplies the image values to an additional intermediate register 45. The transfer is accomplished such that in each the principle and the intermediate image values of a cup are located in two different memory regions 45' and 45" of the intermediate register 45.

The demultiplexer 44 is controlled by a timing sequence $T_6$ which is fed to the selection input 46. For a takeover into the intermediate register 45 two timing sequences $T_7$ and $T_8$ are provided with which the timing inputs 47 and 48 of the intermediate register are supplied.

In the event that during particular instant, a an edge image detail is scanned, the recognition bit is "L" and the AND gate 36 will be opened while the AND gate 35 is blocked.

Then the stored information is continuously taken from the intermediate register 45 into the input register 39 and then recorded in the memory system 23 and the recognition bit "L" is added as a ninth bit.

The stored engraving information for one cup consists of a 9 bit memory word comprising the recognition bit and the stored principle and intermediate image values. Notwithstanding the larger quantity of information resulting from the higher scanning fineness, the original number of memory storage cells in the memory system can remain fixed.

If the image values in the coder 43 are recoded into 3 bit words instead of into 4 bit words, th word length of the stored information is shorter than the word length preformed by the A/D converter 19 and the memory capacity of the memory 23 can be reduced. It is to be realized, of course, that any selected word length and form of coding is possible. The image values may also contain various word lengths.

The Memory System

The memory system 23 accomplishes various functions. For the purpose of changing a scale between the pattern and the reproduction, the memory system may be designed for example according to the description in U.S. Pat. No. 3,272,918 which is hereby incorporated by reference. The relationship of writing to reading timing determines the reproduction scale. The previously mentioned proportionality factor "m" corresponds with the scale factor which, for example, would be one for identical diameters of the scanning and printing cylinders.

In order to provide electronic equalization for different diameters of the printing and scanning cylinders, the memory system 23 may be designed according to U.S. Pat. No. 4,013,829 which is hereby incorporated by reference. The proportionality factor "m" will correspond to the diameter relationship in such case.

In the case mentioned above, only few image lines are stored intermediately. It is also possible to store the image values of the entire pattern in the memory system 23 so as to read them out on a time staggered basis or if application at a different location to control the engraving means.

Data Output Circuit

The data output circuit 24 converts the stored image values into appropriate control data for the engraving means. For this purpose, first the stored data is broken up in order to feed the principle and the intermediate values for one cup consecutively and in a fixed timewise relationship with the screen signal to the engraving means.

The image values stored in the memory system 23 are read out with a reading timing pulse sequence $T_9$ supplied to the reading input 49 which has a frequency of $f_G$. This allows the recognition bit to be separated and examined. If the recognition bit in a continous-tone image detail is "H" an AND gate 50 is prepared by way of conductor 51 and an additional AND gate 52 will be blocked due to the inverter 53 wich is mounted in its input and receives the signal on the conductor 51.

For this case, the read out 8 bit principle values are transferred unchanged by way of an output register 54 and a conductor 55 by means of a timing sequence $T_{10}$ at a frequency of $f_G$ to a transfer register 57. From the transfer register 57, the principle image values are fed continuously to the D/A converter 25. This process is controlled with the timing sequence $T_{11}$ at the timing input 58 of the transfer register 57 and the timing sequence $T_{11}$ has a frequency while is twice that of the frequency $f_G$ of the screen signal so that within one period of the screen signal two times as much engraving information is transmitted on a time staggered basis to the D/A converter 25.

If the recognition bit in a contour image detail is "L", the AND gate 50 will be blocked and the AND gate 52 will be opened. Then the read out stored 8 bit image values will be broken up by means of a multiplexer 59 and a timing sequence $T_{12}$ at the timing input 60 into the principle and intermediate image values of 4 bits and will be fed in sequence of their creation to a decoder 61 where they are reconverted according to a predetermined function into 8 bit engraving data for driving the engraving means 27.

The decoder 61 is a programmable read only memory (PROM) of type SN 74S470.

The engraving data is transmitted at a frequency of $2f_G$ to the D/A converter 25 such that for each period of the screen signal one intermediate and one principle image value are transmitted and these two signals correspond to one cup.

Thus, without increasing the number of memory cells in the memory system 23 two separate engraving data are, thus, available for each cup.

The dual engraving information has the following advantages:

As known, the electro-magnetic engraving means operates as a low pass filter characteristic which determines its transfer properties which means that the interacting relationship between the input signal and the movement of the engraving pin responds as a low pass filter. When an image signal jump occurs, the engraving needle will not move to its new theoretical commanded position determined by the new image value until a certain time lag has transpired. By the controlled superposition of the jumps of the image signal, relative to the phase position of the screen signal it is possible according to the invention to influence the entering and leaving of the engraving needle in the printing form and the penetration depth in the engraving of the cup so that a shift in position of the cups can be accomplished relative to the printing screen which is used for the improved reproduction of the edges.

In the case of a density jump in the pattern, the associated image signal jump is divided in the present invention into two partial jumps which are superimposed consecutively within one period over the screen signal. Thereby, the intermediate image value indicates the "trend" for the direction of movement of the engraving needle into which it is deflected by the subsequent principle image value.

The shifting of the cups occurs in a manner such that those cups which have sizes corresponding to intermediate values between two adjacent density levels of one edge are compressed more tightly against those cups which represent the higher density levels.

The engraving needle experiences the maximum deflection in the direction of the printing form in each case at a periodically re-occurring amplitude value of the screen signal and the engraving of one cup occurs at the timing of the amplitude value.

In one embodiment, these amplitude values comprise the minimum values of the AC voltage, for example.

The transmission of the image values to the D/A converter which is controlled by the timing sequence $T_{11}$ and thus also the superposition of the image signal and the AC voltage occurs in a fixed time-wise association with the minimum values of the AC voltage.

In a first embodiment in the case of an edge, the second partial leap or jump of the image signal (principle image value) is transmitted and superimposed in each case at the time of the minimum value. Minimum values and the timing of the timing sequence $T_{11}$ are in phase.

In a second preferred embodiment, the second partial jumps or leaps are transmitted and superimposed in each case leading in time relative to the minimum values.

A phase shift $\phi_0$ exists between the minimum values of the AC voltage and the timing of the timing sequence $T_{11}$. The phase shift $\phi_0$ appropriately is selected in such a manner that the engraving needle will have reached already its new terminal position predetermined by the image signal leap in the minimum value of the AC voltage. The phase shift $\phi_0$ can be adjusted by changing the input at the programming input $26'$ of the engraving amplifier 26.

Frequently, the image signal is modified between scanning and recording according to a predetermined gradation curve. The amount of gradation is a function of the printing process and the desired editorial changes of the reproductions relative to the original. In adjusting the gradation, the logarithmation of the image signal can also simultaneously take place.

For modifying the analog image signal to correct the gradation desired a function transmitter using the modification of a digital image signal supplied to a programmed read only memory which is programmed according to the gradation function or the gradation and logarithmic function can be utilized.

Such a programmed read only memory may, for example, be interconnected following the A/D converter 19.

It is expedient at times to modify the image signal as a function of the type of pattern being utilized and to obtain different gradation results.

A first gradation stage 62 may be arranged to adjust continuous-tone gradation between lead 33 and lead $33'$ and a second gradation stage 63 for changing the text gradation may be arranged between conductor $33''$ and the input to circuit 22.

This will also provide automatic shifting of the image signal to a corresponding gradation condition as a function of the recognition signal on conductor 34.

One desirable embodiment feature is that the data conversion in the coder 43 is carried out according to the text gradation and not linearly so that the gradation stage 63 can be eliminated.

While the continuous-tone gradation is variable according to the printing requirements whereby positive and negative patterns are to be considered, the gradation of the text is a function of the continuous-tone gradation.

Figure 2:
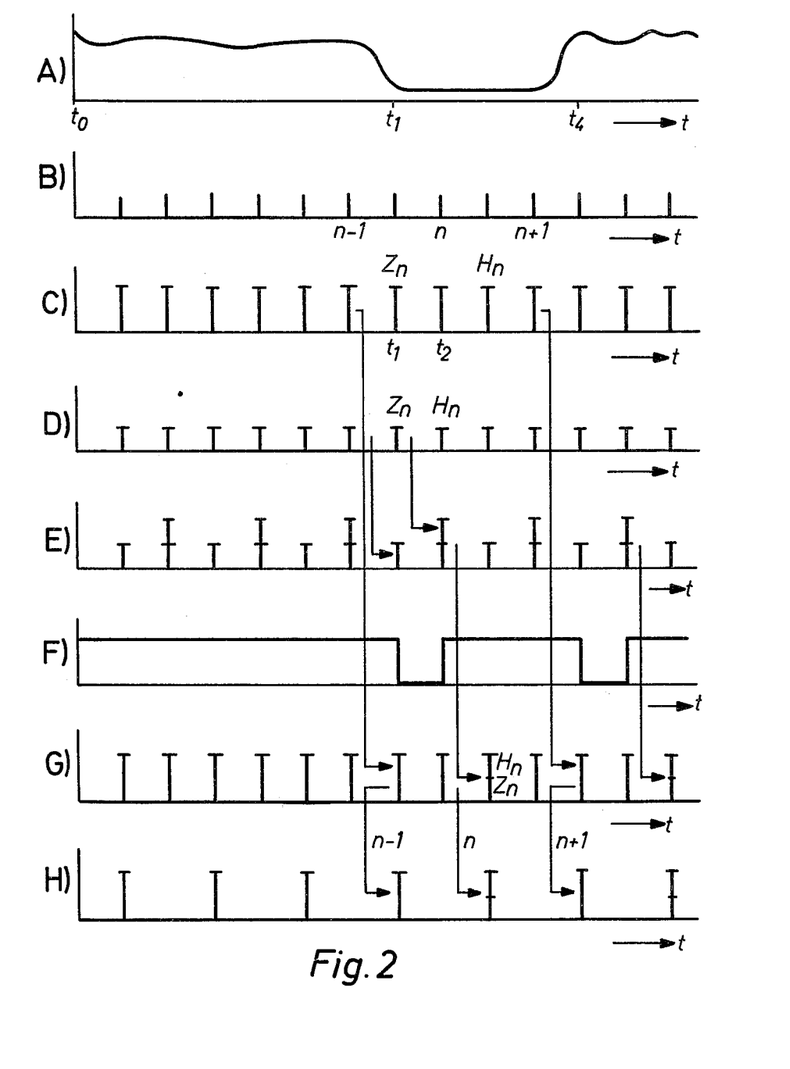
FIGS. 2A through H are plots versus time of various signals utilized in the invention and appearing at various points in the apparatus of the invention.

FIGS. 2A through "H" are signal diagrams to explain the operation as a function of time of the image signal processing between scanning and the intermediate storage.

FIG. 2A illustrates an arbitrary image signal shown with the scanning of an image line whereby the high signal level corresponds to the value "white" and the low signal value corresponds to the tonal level "black". One change from white to black occurs at time $t_1$ and one black to white transfer occurs at time $t_4$.

FIG. 2B illustrates the timing pulse sequence $T_A$ which controls the analog to digital conversion of the image signal.

FIG. 2C schematically represents the 8 bit image values of the A/D converter 19 which are transferred with each timing pulse of the scanning timing sequence $T_A$ into the intermediate register 38. For the n-th cup the principle image value is identified by $H_n$ and the intermediate image value is identified by $Z_n$.

FIG. 2D illustrates the 4 bit image values converted in the coder 43 and the reduced data contents are symbolized by the lower height of these pulses.

In FIG. 2E, the existing contents of the intermediate register 43 are plotted at the timing pulses of the scanning timing sequence $T_A$ and at time $t_1$ the intermediate image value $Z_n$ is stored and at time $t_2$ the principle image value $H_n$ is deposited as an 8 bit image value and stored in the intermediate register 45.

FIG. 2F illustrates the recognition signal which exists on conductor 34. Between time $t_0$ and $t_1$, a continuous-tone image detail is scanned and the recognition signal is "H". At time $t_1$ and at time $t_4$, contour image details are recognized and the recognition bit is "L". The "L" signal exists in each case for the duration of one period of the scanning timing sequence $T_A$ so that at least two image data will be evaluated as contour signals.

FIG. 2G indicates the existing contents of the input register 39 at the time of the scanning timing sequence $T_A$. The image values illustrated in FIG. 2H are recorded with the text timing $T_5$ into the memory system 23. Each image value contains the engraving information for one cup.

Figure 3:
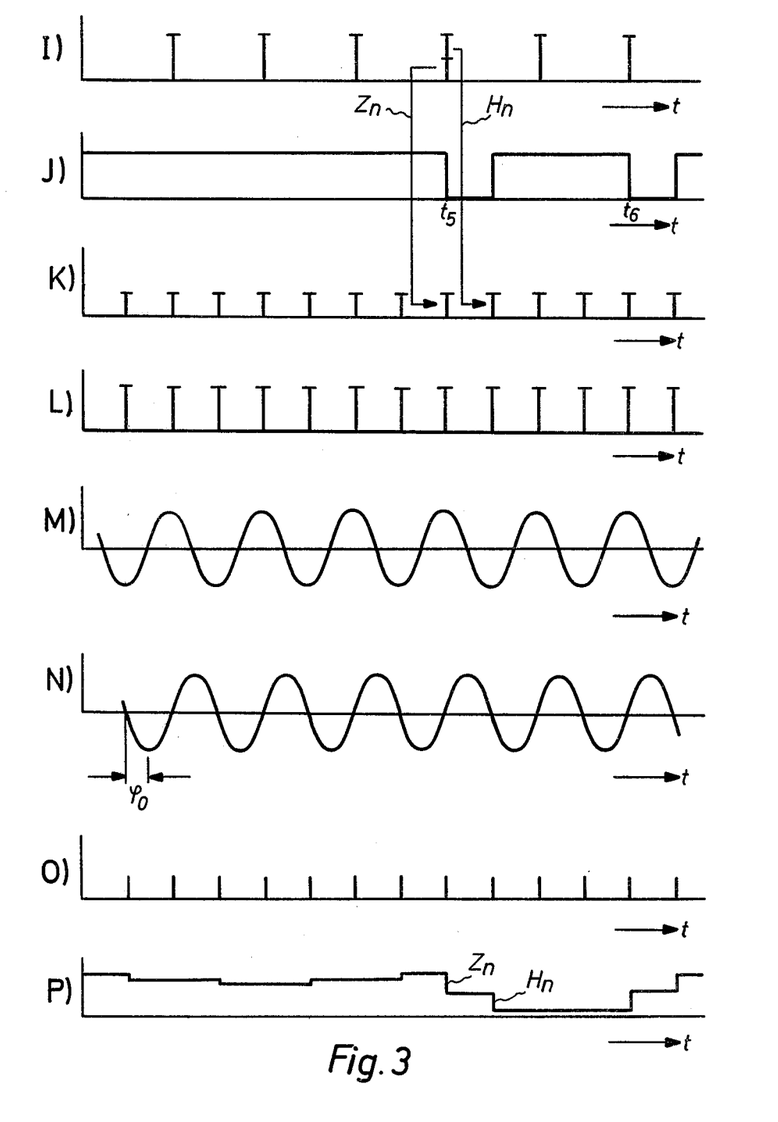
FIGS. 3I through P are plots of various signals against time appearing at various points in the invention.

FIGS. 3I through P illustrate additional timing diagrams to explain the operation in time of the intermediate signal processing between the intermediate storing and recording. FIG. 3I illustrates information stored in addition to the times of the engraving timing sequence $T_G$ and the output register 54.

FIG. 3J illustrates the recognition signal on the conductor 51 which signals that a contour exists at times $t_5$ and $t_6$.

FIG. 3K illustrates the break-up of the stored 8 bit image value into two 4 bit values following each other which are converted in the decoder 61 and to the 8 bit control data for the engraving means 27 which signal is shown in FIG. 3L with heights greater than the signals of FIG. 3K.

FIG. 3M illustrates the screen signal as an alternating voltage wherein the minimum values determined in each case the instance for the engraving of the cups in the printing screen.

The timing sequence $T_{11}$ is plotted in FIG. 3O and for each period of the engraving timing sequence $T_G$ and/or of the screen signal two image values are transmitted by the D/A converter 25.

FIG. 3P illustrates the analog image signal reconverted from the digital image values such that for the engraving of the n-th cup at the density edge jumps two image values $Z_n$ and $H_n$ are available.

In a preferred improvement of the invention, a phase shift $\phi_0$ is utilized such as shown in FIG. 3N between the screen signal and the timing sequence $T_{11}$ so that the image signal jumps which are obtained during the scanning of an edge jump are superimposed onto the screen signal in each case timewise ahead of the engraving of a cup of that a precise tonal value engraving is accomplished.

Figure 4:
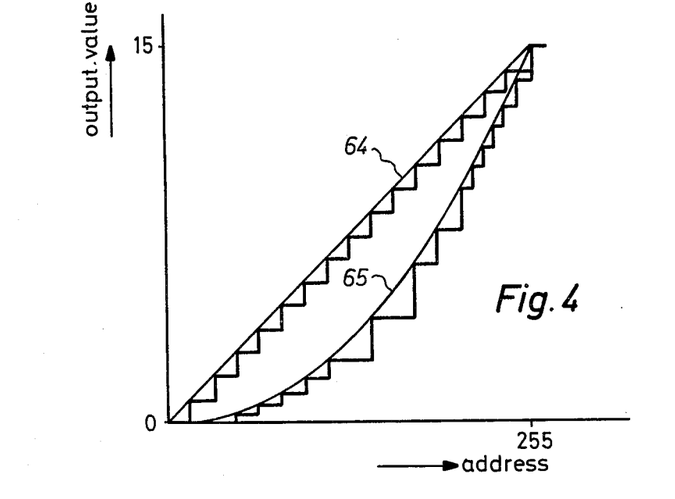
FIG. 4 is a graph which illustrates the programming of the read only memory.

FIG. 4 is a graphic representation of an example of the programming for the read only memory in the coder 41.

The 256 addresses of the read only memory from 0 to 255 are plotted on the horizontal axis of the coordinate system which are selected during the pattern scanning by the digital image signal values with 8 bit resolution.

On the vertical axis, the 16 possible output values of the read only memory are illustrated from 0 to 15 with the lower 4 bit resolution which are stored in the 256 addresses.

A linear association of the image signal values with the output values of the read only memory results according to the function curve 64.

In case of a change of gradation of the image signal, the association can be changed to the curve illustrated by curve 65 in FIG. 4.

Figure 5:
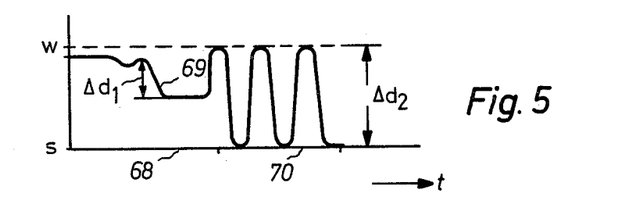
FIG. 5 is a plot of an image signal against time.

FIG. 5 comprises a diagram of an image signal path between the amplitude of "Black" (S) and "White" (W) in a continuous-tone range 68 of a pattern having an edge 69 and in a text range 70. The edge 69 is identified by an image signal jump $\Delta d_1$ and the text range is identified by the density jumps $\Delta d_2$. For the identification of such density jumps, continuously consecutive image values are compared with each other and evaluated as edges when the difference in density exceeds a predetermined magnitude.

Figure 6:
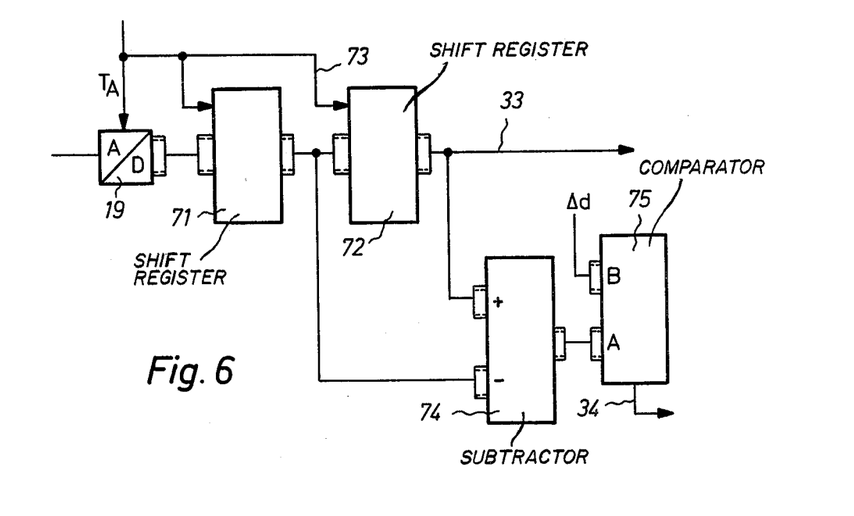
FIG. 6 is a block diagram of the contour recognition circuit.

FIG. 6 illustrates an embodiment of an edge recognition circuit where the edge recognition signal is derived from an unidimensional data flow of the digitalized image signal.

The analog to digital converter 19 is connected to a pair of 8 bit shift registers 71 and 72 in which by the use of the scanning timing sequence $T_A$ in each case 8 bit image values are stored intermediately. Conductor 73 supplies the scanning timing sequence $T_A$ through the shift registers 71 and 72 and the image values are stored in the shift registers before reaching the data input circuit 22 illustrated in FIG. 1. The image values stored intermediately are fed to a subtractor 74 which is connected to the outputs of the shift registers 71 and 72 which forms in each case a different signal (A) from two adjacent image values. A comparator 75 receives the output of the subtractor 74 and compares the difference (A) with the density difference $\Delta d(B)$. If A is greater than B than the edge recognition signal is produced and supplied to conductor 34. The density difference may be varied and depends on the desired requirements. If, for example, the density difference equal $\Delta d_2$ edges in the continuous-tone area 68 will not be regarded and the edge recognition signal will be constant over the entire text range 70. See FIG. 5.

It is to be realized, of course, that the edge recognition signal may be also generated in an analog circuit for example with sample and hold circuits or by means of a photo diode array oriented in the scanning direction. It is also possible to derive the edge recognition signal with a two dimensional outer field evaluation from the data of the image points adjacent to an actual image dot.

This would require intermediate storing of the data of one line and of adjacent lines.

In the event of total image storing, the edge recognition signal also could be calculated from the total of the stored image data of a pattern or from separately stored surrounding field data.

Figure 7:
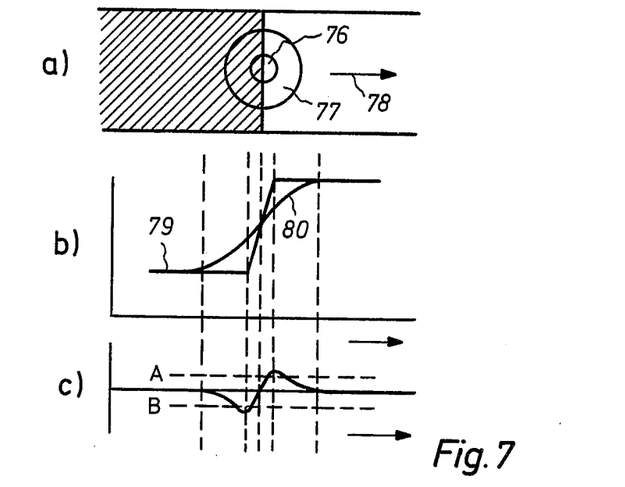
FIGS. 7a through 7c comprise time plots for scanning a particular area.

FIGS. 7a through c are time plots which show additional differentiating characteristics obtained for an edge in the pattern by a two dimensional outer field evaluation. Because the difference between the outer field signal and the image signal is a function of the density contrast, thresholds are determined whereby if such thresholds are exceeded the image data just immediately scanned is evaluated as the edge and an edge recognition signal is derived.

The time graph illustrates in FIG. 7a an edge which is scanned simultaneously with an image diaphragm 76 and an outer field diaphragm 77 larger in diameter than the image diaphragm 76. The direction of scanning is indicated by arrow 78.

FIG. 7b illustrates the image signal 79 and the outer field signal 80 during the scanning of an edge in the direction of the arrow 78.

FIG. 7c illustrates the differential signal between the image and outer field signals and two thresholds A and B are shown. If the differential signal exceeds both thresholds, the scanned image information is evaluated as an edge.

Figure 8:
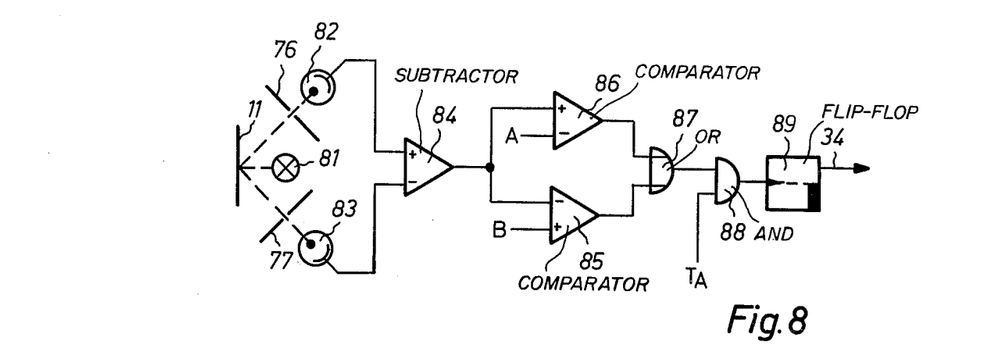
FIG. 8 is a block diagram illustrating a modified contour recognition circuit according to the invention.

FIG. 8 illustrates an embodiment for an edge recognition system with optical outer field evaluation. The pattern 11 is illuminated by a luminous source 81 and the light reflected by the pattern 11 falls through the image dot diaphragm 76 upon a first opto-electronic converter 82 in which the image signal is obtained. The light reflected by the outer field diaphragm 77 is converted in a second photo-electric converter 83 into an outer field signal. The image signal and the outer field signal are supplied to a subtractor 84 and the output differential signal from the subtractor 84 is fed to two comparators 85 and 86 where the difference signal is compared with the threshold values A and B supplied to the comparators 85 and 86 respectively.

The comparators 85 and 86 may be type LM 311 manufactured by National Semiconductors. These equipment provide a TTL recording level and it can be combined with logic circuits.

The output signals of the comparators 85 and 86 are supplied to an OR gate 87 which supplies an output to an AND gate 88 which has its output connected to a flipflop circuit 89. For synchronizing the different signals the AND gate 88 receives the scanning timing sequence $T_4$ as illustrated. The desired edge recognition signal appears on the conductor 34 at the output of the flipflop circuit 89.

Figure 9:
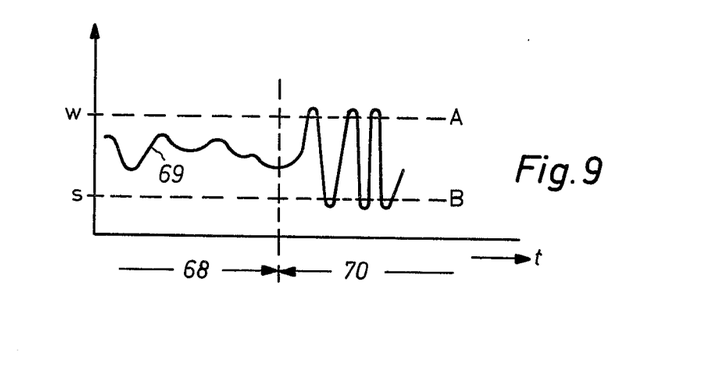
FIG. 9 is a plot of an image signal versus time.

FIG. 9 illustrates a possibility for obtaining a recognition signal for continuous-tone and text areas of the pattern from the image signal. In FIG. 9, the plot of the image signal 69 is shown in a continuous-tone area 68 and in the text area 70. The density difference between the brightest and the darkest image locations in the continuous-tone area is limited by the black level S and by the white level W and which can be adjusted in a calibration process.

In the continuous-tone area 68, the image signal 69 fluctuates between the levels W and S in the text range 70 the image signal exceeds the levels W and S calibrated for the continuous-tone area.

According to the invention, all those image data are evaluated as text or edges whose image signal amplitudes are located above the white level and/or below the black level.

Figure 10:
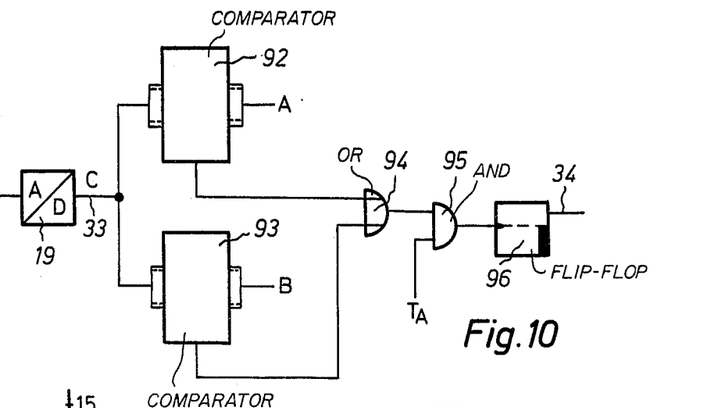
FIG. 10 is a block diagram of a recognition circuit for continuous-tone and text areas according to the invention.

FIG. 10 illustrates an embodiment of the recognition circuit for continuous-tone and text areas which produces a recognition signal according to the characteristics for differentiation indicated in FIG. 9.

The image signal digitalized in the A/D converter 19 is fed into two comparators 92 and 93 which may be for example 4 bit comparators type SN 7485. The image signal C is compared in the comparators 92 and 93 with the white level A and the black level B redetermined as binary numbers. The output signals of the comparators 92 and 93 are supplied to an OR gate 94 which supplies an output to an AND gate 95 which supplies an output to a flipflop circuit 96. AND gate 95 receives the scanning timing sequence $T_4$ for synchronization purposes. The recognition signal for continuous-tone and text areas of the pattern appears on conductor 34.

It is to be realized of course that the recognition signal may also be obtained by the use of threshold value circuits from the analog image signal.

Figure 11:
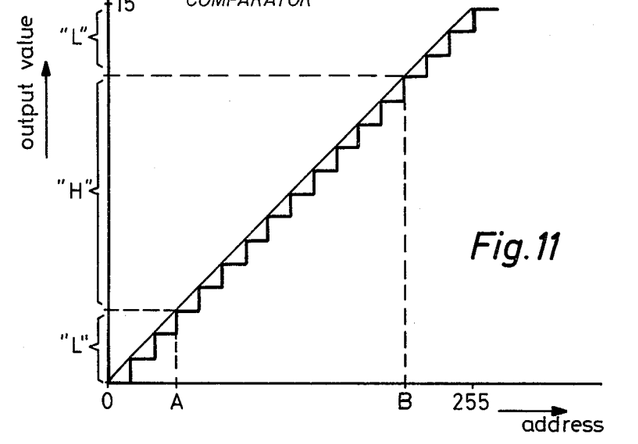
FIG. 11 is a plot for explaining the programming of the read only memory.

In an advantageous improvement, the recognition circuit according to FIG. 10 can be eliminated and the recognition signal and/or the recognition bit may be stored into the read only memory of the coder 45 of FIG. 1 as illustrated in FIG. 11 in an additional graphic representation. The programming of the read only memory is first accomplished as shown in FIG. 4.

First, however, the recognition bit "L" (text) is stored under the addresses 0 to A and B to 235 and the recognition "H" (continuous-tone) is stored under the addresses A to B. In this case, the conductor 34 illustrated in FIG. 1 is connected to the output of the read only memory in coders 43.

The different recognition circuits also may be used to advantage for connecting the image signal during reproduction of the instantaneously scanned continuous-tone or text areas of the pattern on different levels of contrast.

Figure 12:
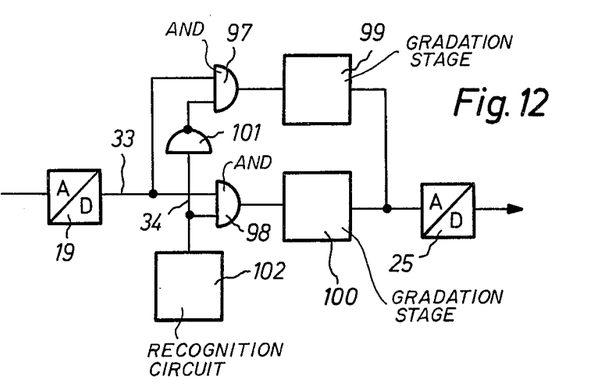
FIG. 12 is a block diagram illustrating the switching means for the gradation stages of the invention.

FIG. 12 illustrates an embodiment for switching the gradation stages in the signal path of the image signal. The image signal obtained with pattern scanning is digitalized in the A/D converter 19 and fed to conductor 33 to AND gates 97 and 98. A gradation stage 99 receives an input from gate 97 and is programmed with a continuous-tone gradation and a gradation stage 100 is connected to gate 98 and is programmed with a text gradation. The differently modified image signal is reconverted again in a subsequent D/A converter into an analog image signal and fed to the recording device.

The AND gates 97 and 98 are controlled by recognition circuit 102 either directly or through an inverter 101 as illustrated.

It is also to be realized the analog image signal may also be shifted by means of an analog switch controlled by an appropriate recognition circuit to different analog gradation stages.

Although the invention has been described with respect to preferred embodiments, it is not to be so limited as changes and modifications can be made which are within the full intended scope of the invention as defined by the appended claims.

I claim as my invention:

1. A method for improved reproduction of sharp change in tone density edges occurring during the engraving of screened printing forms, wherein an engraving tool of an electromagnetic engraving member cuts a plurality of cups arranged in a printing screen into said printing forms, said engraving member being controlled by an engraving signal derived from superposition of an image signal and a screening signal, and wherein said screening signal for producing said printing screen actuates an oscillating movement of said engraving tool at a frequency of the screening signal, whereby the engraving tool in each case has its largest deflection in the direction of the printing form at a periodically recurrent amplitude value of the screening signal, the method comprising the steps of, scanning an original with a resolution in the scanning direction which is higher than that of the printing screen to generate said image signal, digitalizing said image signal into principal image values at the frequency of the screening signal and into additional intermediate image values occurring between said principal image values, said image values having predetermined word lengths, identifying edges which coincide with sharp changes in tone-density of the original and generating a recognition signal if an edge occurs, recoding the principal and intermediate image values into image values of shorter word lengths if said recognition signal occurs, combining a principal image value of shorter word length and the associated intermediate image value into one combined memory word, storing in a memory intermediately the combined memory word, separating said combined memory word after reading out from the memory into the principal image value and the associated intermediate image value, if said recognition signal does not occur, storing only the principal image values as memory words in said memory, superimposing said read out princip. l image values onto said screening signal at the instants of its recurrent amplitude values, and superimposing said intermediate image values in the sequence and at the instants of their creation.

2. The method according to claim 1 wherein the resolution in the scanning direction is selected to be twice as large as that of the printing screen, whereby one addition intermediate image value is created between two successive principal image values, and wherein in each case one principal image value and the preceding intermediate image value are combined into one memory word.

3. The method according to claim 1 wherein the combined memory words have predetermined word lengths.

4. The method according to claim 1 wherein the principal image values are read from the memory and processed at the instants of their superposition onto said screening signal.

5. The method according to claim 4 wherein said recurrent amplitude values of the screening signal correspond with its peak values.

6. The method according to claim 1 wherein said read out memory words are examined after their combination and separated into said principal image values and said intermediate image values if required.

7. The method according to claim 6 wherein said separated principal and intermediate image values are recorded according to a non-linear function.

8. The method according to claim 7 wherein said principal and intermediate image values are converted according to different functions of gradations in response to said recognition signal.

9. The method according to claim 1 wherein said separated principal and intermediate image values of shorter word lengths are recoded into image values of said predetermined word lengths.

10. The method according to claim 1 wherein said principal and intermediate image values are converted according to a gradation function.

11. The method according to claim 1 wherein said principal and intermediate image values are recoded into image values of shorter word lengths according to a function of gradation in response to said recognition signal.

12. The method according to claim 1 wherein said recognition signal is derived from comparison of consecutive image values.

13. The method according to claim 1 comprising the further steps of storing said recognition signal intermediately in said memory and separating said memory words in response to said read out recognition signal.

14. The method according to claim 1 comprising the further steps of scanning said original with an electronical unsharp masking to obtain an unsharp image signal, and generating said recognition signal by evaluating the difference values between said image signal and said unsharp image signal with said difference values representing edges in the original.

15. The method according to claim 1 wherein the original has continuous-tone and line areas, comprising the further steps of generating a mask representing said continuous-tone and line areas of the original, and scanning said mask to obtain said recognition signal.

16. The method according to claim 1 wherein the original has continuous-tone and line areas, comprising the further steps of comparing said image signal with calibration values representing the tonal values "black" and "white" of the continuous area of said original, and generating said recognition signal from said comparison.

17. A method for improved reproduction of sharp changes in the tone density edges occurring during the engraving of screened printing forms, wherein an engraving tool of an electromagnetic engraving member cuts a plurality of cups arranged in a printing screen into said printing forms, said engraving member being controlled by an engraving signal derived from superposition of an image signal and a screening signal, and wherein said screening signal for producing said printing screen actuates an oscillating movement of said engraving tool at a frequency of the screening signal, whereby the engraving tool in each case has its largest deflection in the direction of the printing form at a periodically recurrent amplitude value of the screening signal, the method comprising the steps of, scanning an original with a resolution in the scanning direction which is higher than that of the printing screen to generate said image signal, digitalizing said image signal into principal image values at the frequency of the screening signal and into additional intermediate image values occurring between said principal image values, said image values having predetermined word lengths, identifying edges which coincide with sharp changes in tone-density of the original and generatng a recognition signal if an edge occurs, recoding the principal and intermediate image values into image values of shorter word lengths, if said recognition signal occurs, combining a principal image value of shorter word length and the associated intermediate image value into one combined word, storing in a memory intermediately the combined memory word, separating said combined memory word after reading our from the memory into the principal image value and the associated intermediate image value if said recognition signal does not occur, storing only the principal image values as memory words in said memory, superimposing said read out principal image value onto said screening signal at instants which lead in time relative to its recurrent amplitude values, and superimposing said intermediate image values onto said screening signal in the sequence and at the instants of their creation.

18. The method according to claim 17 wherein the lead in time is selected to be approximately equal to the buildup time of said engraving tool when actuated by a jump of the image signal caused by scanning an edge in said original.

* * * * *